June 6, 1944. E. C. McDANIEL 2,350,624
TRAILER DOLLY
Filed Nov. 3, 1942 2 Sheets-Sheet 2
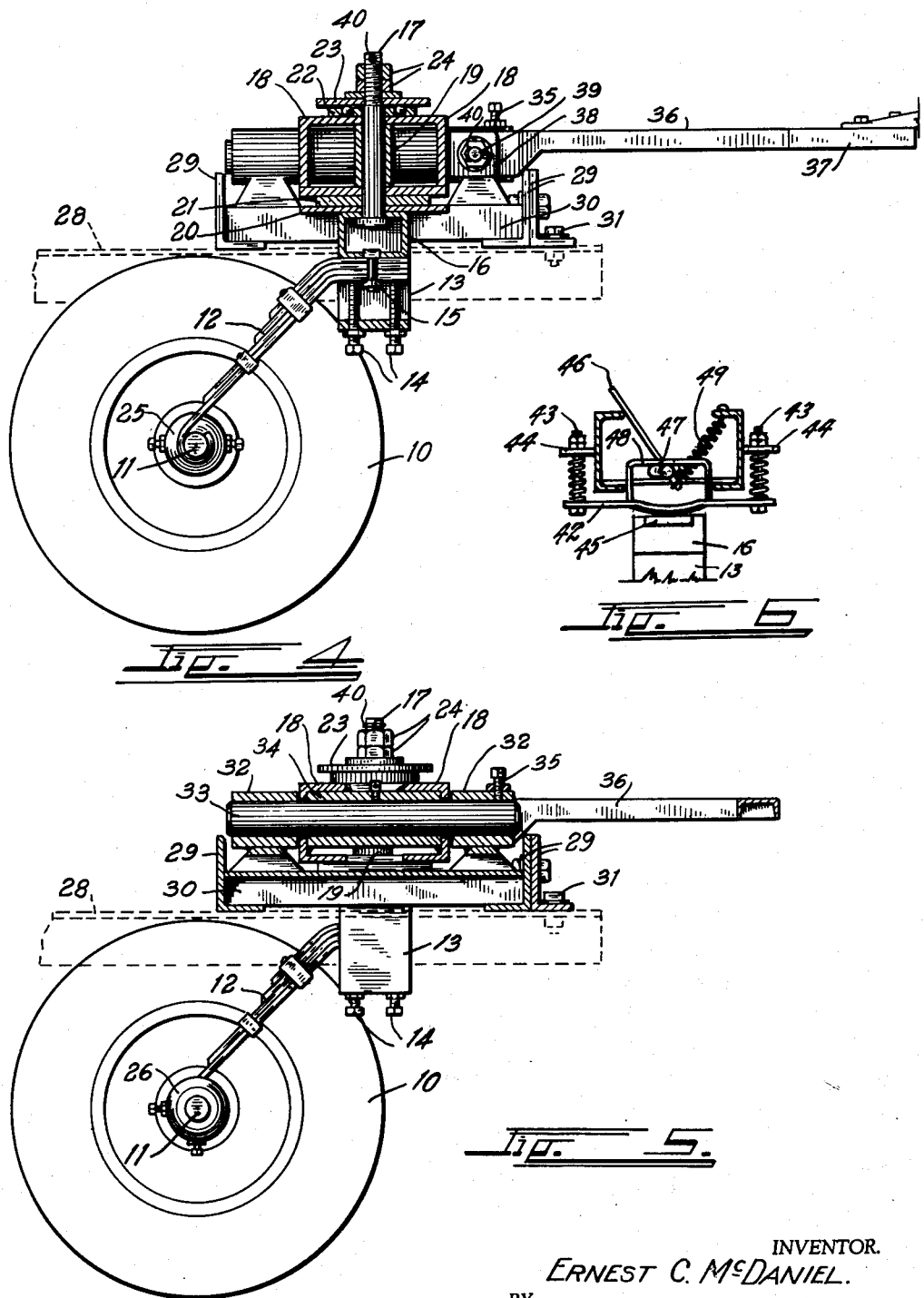
INVENTOR.
ERNEST C. McDANIEL.
BY
ATTORNEY.

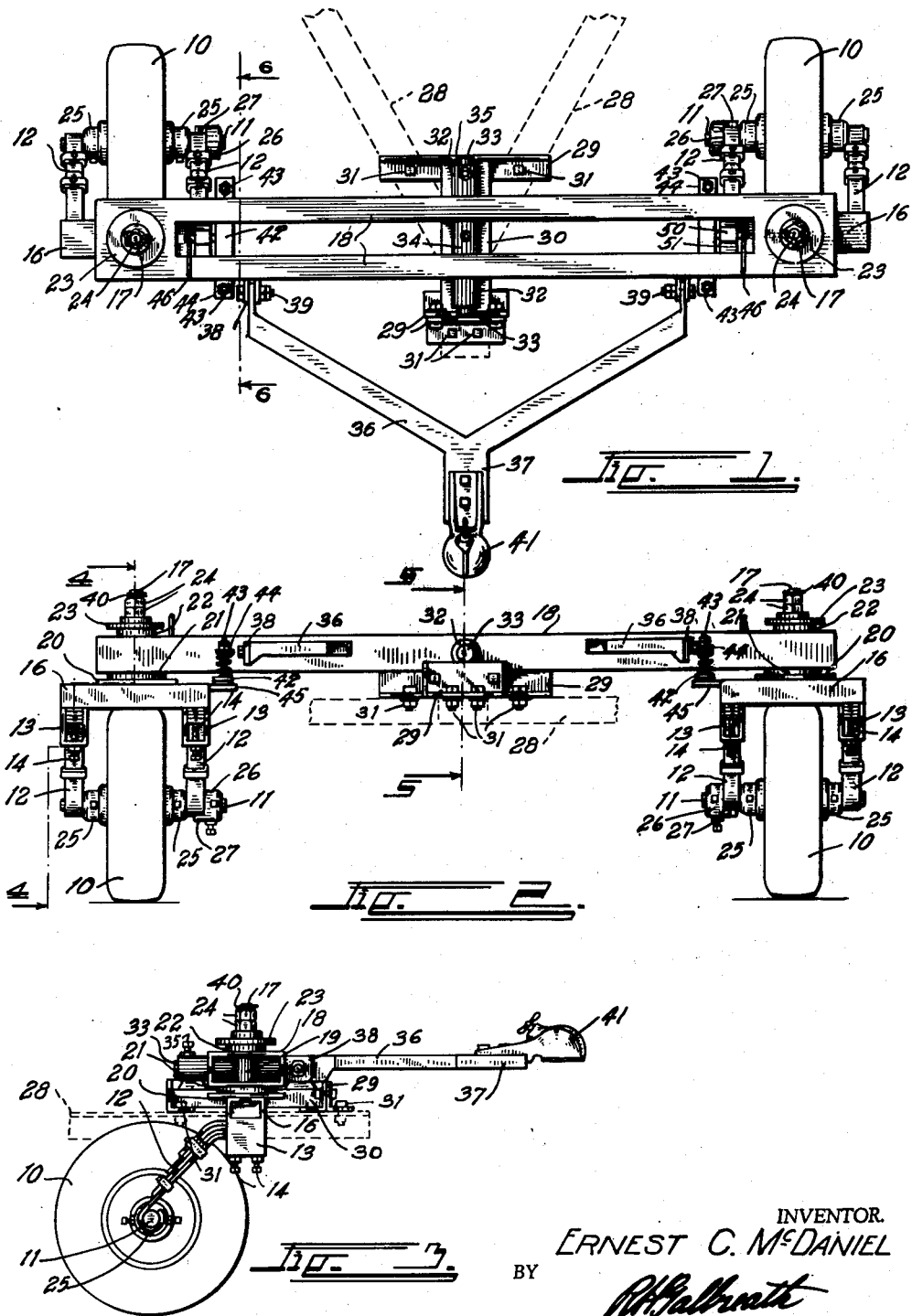

Patented June 6, 1944

2,350,624

UNITED STATES PATENT OFFICE 2,350,624

TRAILER DOLLY

Ernest C. McDaniel, Denver, Colo.

Application November 3, 1942, Serial No. 464,405

7 Claims. (Cl. 280—33.4)

This invention relates to a trailer dolly, that is, to a vehicle or truck for carrying the weight of the forward portion of a two wheeled automotive trailer, and has for its principal object the provision of a simple, compact device which will support the entire weight of the forward portion of a two wheeled trailer so as to relieve the weight on the tow car.

Other objects of the invention are to provide a two wheeled truck for supporting the front of a two wheeled trailer which will allow the trailer and the tow car to rock laterally under road conditions without imparting twisting strains to the respective frames; to provide a front trailer truck which will rigidly communicate all sideward movements of the trailer tongue to the trailer chassis in a manner similar to a structural two wheel trailer so that the trailer will follow all movements of the tow car when being backed into position and so that all "jack-knifing" or whipping will be eliminated.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved trailer dolly;

Fig. 2 is a front view thereof with the tongue member partially broken away;

Fig. 3 is a side view thereof;

Fig. 4 is an enlarged, vertical section, taken on the line 4—4, Fig. 2;

Fig. 5 is a similar section, taken on the line 5—5, Fig. 2, and

Fig. 6 is a detail section, taken on the line 6—6, Fig. 1 illustrating the caster brake mechanism.

The improved trailer dolly is supported on a pair of spaced-apart caster wheels 10, each of the wheels is carried on a wheel axle 11 which in turn is supported in eyes in a pair of cantilever leaf springs 12. The upper extremity of each spring 12 enters a spring box 13, in which the extremities of the springs are clamped by means of a pair of pressure screws 14. A clamp bolt 15 clamps the leaves of each spring together. The spring boxes 13 are formed on the extremities of a pivoted wheel frame member 16.

A threaded king pin 17 extends upwardly from the middle of each of the wheel frame members 16 through a main cross frame 18. The cross frame preferably comprises a pair of angle irons arranged in parallel relation and boxed in at their tops and bottoms at each extremity to provide a vertical bearing support for the king pins 17. A bearing sleeve 19 is welded into the boxed-in extremities of the cross frame 18 to provide bearings for the king pins.

A turning plate 20 is secured on the top of each wheel frame member 16 around the king pin 17. A free turning washer 21 carries the weight from the main cross frame 18 to each turning plate 20. A ball thrust bearing 22 surrounds each king pin above the main frame 18 and a thrust plate 23 is clamped against the bearing by means of suitable lock nuts 24 threaded on to the king pins 17, and held in place by means of suitable cotter keys 40. Thus, the wheels 10 are free to swing throughout a complete radius of 360°.

The axles 11 are free to rotate in the eyes of the springs 12. Side movement of the axles is prevented by means of set collars 25 clamped to the axle. Rotation of the axles 11 within the spring eyes is limited by means of stop sleeves 26 secured on the extremities of the axles. These sleeves are provided with tongues 27 which allow a relative movement of the axle in the springs to accommodate uneven flexing of the springs but which will prevent complete rotation of the axle so that the spring eyes will not be worn away.

The usual trailer chassis terminates in a V-shaped forward extremity, as indicated in broken line at 28. This forward extremity of the chassis is attached to the trailer dolly by means of an attachment frame consisting of two cross bars 29 joined by a middle bar 30. The cross bars 29 are bolted to the trailer frame in any desired manner such as by means of attachment bolts 31.

The middle bar 30 of the attachment frame carries two spaced-apart shaft sleeves 32, positioned at right angles to the frame 18 and at the middle thereof. A rocker shaft 33 extends through the two shaft sleeves and through a bearing sleeve 34 which is welded or otherwise secured in the main frame 18. The shaft is locked in place by means of a suitable set screw 35. This construction allows the trailer chassis 28 complete freedom to rock and tilt laterally without effecting the main frame 18. It also allows the main frame 18 to tilt laterally without effecting the trailer chassis 28.

A V-shaped tow bar 36, terminating in a stub tongue 37, is hingedly secured between hinge ears 38 on the forward face of the main frame 18.

The attachment is made by means of suitable hinge pins 39, extending through the hinge ears 38 and through the extremities of the tongue member 36. The stub tongue 37 carries the usual towing ball socket 41 for attachment to the usual towing ball on the tow car.

It can be readily seen that this construction allows the tow car to move upwardly or downwardly, with relation to the main frame 18, without effecting the stability of the latter and it also prevents vertical movement of the main frame from being transmitted to the tow car.

It will be noted that the improved trailer dolly allows free lateral tilting and vertical movement but that it does not allow relative sideward movement between the tow car and the trailer since the frame 18 cannot rotate in a horizontal plane relative to the chassis frame 28. This construction absolutely prevents the usual dangerous weaving encountered in towing three or four wheeled trailers since any tendency for the trailer to side-sway is communicated directly to the tow car. This construction also causes the trailer to accurately follow the steering and backing movements of the tow car, there being no kinking action or "jack-knifing" possible between the two during a backing operation.

To prevent the two wheels from "fish-tailing" or swinging back and forth on their king pins 17, at high speeds, caster brakes are provided as shown in Fig. 6, there being one brake for each wheel. Each of these consists of a brake bar 42 provided with a braking surface of brake lining or any suitable material. The brake bar is suspended on hanger bolts 43 from ears 44 on the cross frame 18. Springs 45 constantly urge the brake bar downwardly against a brake shelf 45 on the wheel frame member 16 whenever the wheels are in the straight ahead position. Should it be desired to release the brakes for turning the vehicle by hand a releasing handle 46 may be swung to one side. This rotates a cam 47 against the bottom of a looped bar 48 which is secured on the brake bar so as to raise the latter out of contact with the shelf 45. A return spring 49 returns the releasing handle when it is desired to again bring the brake into play.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A trailer dolly comprising: a cross frame member; a longitudinally extending elongated hinge in the middle of said cross frame member for allowing vertical tilting of the latter and for preventing horizontal rotation thereof; means for attaching said hinge to the forward extremity of a trailer; a vertical socket at each extremity of said cross frame member; a vertical post rotatably mounted in each socket; a caster wheel bracket carried on the lower extremity of each post; a caster wheel supported in each bracket, rearwardly of said post; and a tongue member hinged to said frame member on a horizontal axis and extending forwardly thereof.

2. A trailer dolly comprising: a cross frame member; a longitudinally extending elongated hinge in the middle of said cross frame member for allowing vertical tilting of the latter and for preventing horizontal rotation thereof; means for attaching said hinge to the forward extremity of a trailer; a vertical socket at each extremity of said cross frame member; a vertical post rotatably mounted in each socket; a caster wheel bracket carried on the lower extremity of each post; a pair of spaced-apart leaf springs secured to each of said caster wheel brackets and extending rearwardly and downwardly therefrom; a caster wheel positioned between each pair of springs; and an axle for said wheel supported at the extremities of said springs.

3. A wheel mounting for trailer dollies comprising: a vertical king pin; a vertical bearing for said king pin in said dolly; a bracket member horizontally positioned on the lower extremity of said king pin; a leaf spring extending rearwardly and downwardly from each extremity of said brackets; a wheel axle supported between the extremities of said springs; and a wheel rotatably mounted on said axle.

4. A wheel mounting for trailer dollies comprising: a vertical king pin; a vertical bearing for said king pin in said dolly; a bracket member horizontally positioned on the lower extremity of said king pin; a leaf spring extending rearwardly and downwardly from each extremity of said brackets; a wheel axle supported between the extremities of said springs; a wheel rotatably mounted on said axle; and brake means for resisting rotation of said king pin when said wheel is in the straight ahead position.

5. A wheel mounting for trailer dollies comprising: a vertical king pin; a vertical bearing for said king pin in said dolly; a bracket member horizontally positioned on the lower extremity of said king pin; a leaf spring extending rearwardly and downwardly from each extremity of said brackets; a wheel axle supported between the extremities of said springs; a wheel rotatably mounted on said axle; brake means for resisting rotation of said king pin when said wheel is in the straight ahead position; and means for releasing said resisting means when desired.

6. A wheel mounting for trailer dollies comprising: a vertical king pin; a vertical bearing for said king pin in said dolly; a bracket member horizontally positioned on the lower extremity of said king pin; a leaf spring extending rearwardly and downwardly from each extremity of said brackets; a wheel axle supported between the extremities of said springs; a wheel rotatably mounted on said axle; a friction member projecting from each bracket member; a brake shoe in the path of said friction member to resist rotation of said wheel frame member; and spring means for urging said brake shoe against said friction member.

7. A wheel mounting for trailer dollies comprising: a vertical king pin; a vertical bearing for said king pin in said dolly; a bracket member horizontally positioned on the lower extremity of said king pin; a leaf spring extending rearwardly and downwardly from each extremity of said brackets; a wheel axle supported between the extremities of said springs; a wheel rotatably mounted on said axle; a friction member projecting from each bracket member; a brake shoe in the path of said friction member to resist rotation of said wheel frame member; spring means for urging said brake shoe against said friction member; and manual means for lifting said brake shoe against the action of said springs.

ERNEST C. McDANIEL.